United States Patent
Cherabuddi et al.

[11] Patent Number: 5,996,048
[45] Date of Patent: Nov. 30, 1999

[54] INCLUSION VECTOR ARCHITECTURE FOR A LEVEL TWO CACHE

[75] Inventors: Rajasekhar Cherabuddi, Sunnyvale; Ricky C. Hetherington, Pleasanton, both of Calif.

[73] Assignee: Sun Microsystems, Inc., Palo Alto, Calif.

[21] Appl. No.: 08/879,530

[22] Filed: Jun. 20, 1997

[51] Int. Cl.⁶ ............................................. G06F 12/08
[52] U.S. Cl. .................... 711/122; 711/119; 711/125; 711/126; 711/144
[58] Field of Search .................. 711/122, 144, 711/119, 125, 126, 123

[56] References Cited

U.S. PATENT DOCUMENTS

| | | | |
|---|---|---|---|
| 5,119,290 | 6/1992 | Loo et al. | 711/210 |
| 5,195,089 | 3/1993 | Sindhu et al. | 370/235 |
| 5,307,477 | 4/1994 | Taylor et al. | 711/3 |
| 5,355,467 | 10/1994 | MacWilliams et al. | 711/146 |
| 5,369,753 | 11/1994 | Tipley | 711/122 |
| 5,440,707 | 8/1995 | Hayes et al. | 711/3 |
| 5,530,832 | 6/1996 | So et al. | 711/122 |
| 5,584,013 | 12/1996 | Cheong | 711/122 |
| 5,740,400 | 4/1998 | Bowles | 711/144 |
| 5,796,980 | 8/1998 | Bowles | 711/144 |

*Primary Examiner*—Eddie P. Chan
*Assistant Examiner*—T. V. Nguyen
*Attorney, Agent, or Firm*—Townsend & Townsend and Crew LLP

[57] ABSTRACT

A cache architecture with a first level cache and a second level cache, with the second level cache lines including an inclusion vector which indicates which portion of that line are stored in the first level cache. In addition, an instruction/data bit in the inclusion vector indicates whether a portion of that line is in the instruction cache at all. Thus, when a snoop is done to the level two cache, additional snoops to the level one cache only need to be done for those lines which are indicated as present by the inclusion vector.

16 Claims, 9 Drawing Sheets

INCLUSION VECTOR ARCHITECTURE FOR A LEVEL TWO CACHE

BACKGROUND OF THE INVENTION

The present invention relates to microprocessors with two levels of cache, and in particular to those with a level two cache on-chip with a larger line size than the level one cache, and having inclusion.

With the high on-chip transistor integration technologies available today, modern microprocessor architectures are able to incorporate a small level one cache, typically broken up into a level one instruction cache and a level one data cache. This is typically backed up with a large level two cache which contains both instructions and data. Typically, the line size of a level one cache is much shorter, and is dictated by the number of address and data lines which can be internally routed on the chip and the machine architecture that demands tremendous level two cache bandwidth and minimum latency. In the level two cache, on the other hand, the line size is more dependent upon the external bus size or the size of a connection to a level three dedicated cache. An ideal line size for a level two cache might be up to four times or more longer than the level one cache line size for the optimal design conditions, considering the system bandwidth and the internal level one and level two cache bandwidth.

However, such a ratio of the level two to level one line size causes a problem in a multi-processor architecture where there is snooping on the level two cache. Snooping is done to maintain data consistency where multiple processors are operating on the same data. While a single snoop may go to a single line in a level two cache, this then requires multiple snoops to the level one cache. Even with a dual ported level one cache, such a number of snoops can interfere with the processor operation. Accordingly, typically designs keep the ratio of the level two line size to the level one line size to be two to one at the most.

It would be desirable to have a higher ratio of level two to level one cache line size, while reducing the number of snoops required.

SUMMARY OF THE INVENTION

The present invention provides a cache architecture with a first level cache and a second level cache, with the second level cache lines including an inclusion vector which indicates which portions of that line are stored in the first level cache. In addition, an instruction/data bit in the inclusion vector indicates whether a portion of that line is in the instruction cache at all.

Thus, when a snoop is done to the level two cache, additional snoops to the level one cache only need to be done for those lines which are indicated as present by the inclusion vector. The present invention also limits the number of level one cache accesses for other than snoop operations. For example, when a level two cache line is victimized, each corresponding level one cache line would normally need to be invalidated. The inclusion vector enables a determination of which level one lines need to be invalidated, without requiring an inquiry of all the level one cache lines.

Similarly, for self-modifying code, data and then an instruction is typically written to the level two cache. The inclusion vector allows a determination of whether there is a need to write the instruction to the instruction cache or invalidate it.

Although not necessary, the present invention is preferably used in a cache system using inclusion. Inclusion means that every entry in a level one cache is also in the level two cache.

The present invention also allows synonym detection. Where a cache architecture has a virtual first level cache, and a physical second level cache, there can be a miss in the first level cache and a hit in the second level cache if the physical address in the second level cache corresponds to a different virtual address than what is stored in the first level cache. In this instance, a first level cache virtual address may be a synonym of the virtual address which would cause a hit, since both relate to the same physical address. In this case, the presence of the synonym can be detected if the inclusion vector is set, allowing it to be invalidated in the level one cache.

The inclusion vector of the present invention preferably also includes a dirty bit. This dirty bit will be set when a portion of the line in the level two cache has been modified in the level one cache. This allows a reduction in snoop response latency. Upon a snoop, this bit in the second level cache can be checked to see if there is more modified data in the first level cache. This reduces the need to always check the first level cache where the dirty bit is not set.

For a further understanding of the nature and advantages of the invention, reference should be made to the following description taken in conjunction with the accompanying drawings.

DESCRIPTION OF THE PREFERRED EMBODIMENT

Figure 1:
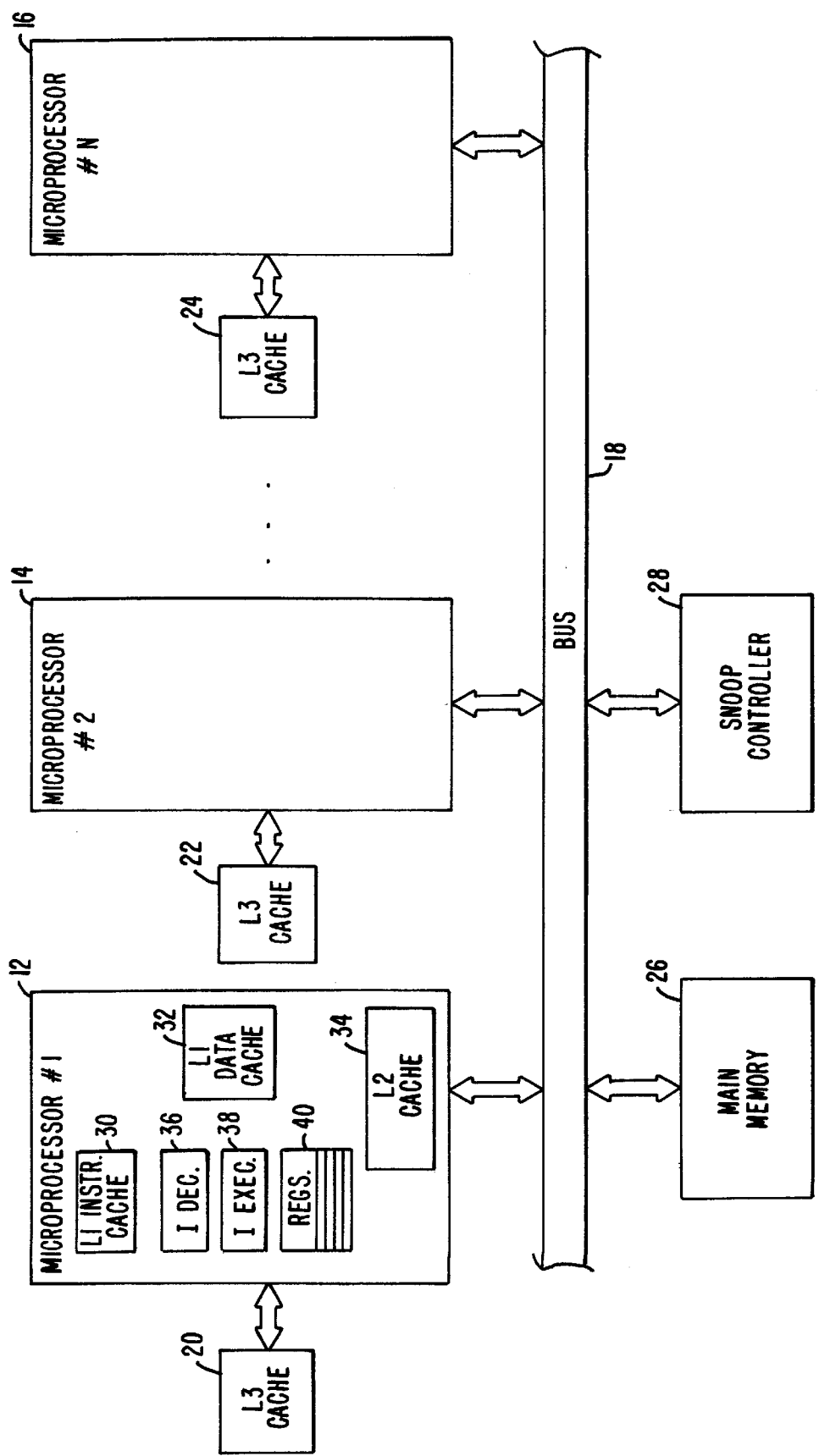
FIG. 1 is a block diagram of a typical prior art multi-processor system including three levels of caches.

FIG. 1 illustrates an example of a multi-processor architecture. Shown in FIG. 1 are three microprocessors 12, 14, and 16 connected to a bus 18. Additional microprocessors could be connected, or fewer microprocessors could be connected. Each microprocessor include its own, dedicated level three cache, labelled 20, 22, and 24. Main memory 26 is also connected to the bus, as is a snoop controller 28.

Internally, at a high level, microprocessor 12 includes a level one instruction cache 30 and a level one data cache 32. A level two cache 34 that is much larger is also included. In very general terms, the microprocessor operates with instructions from instruction cache 30 which are fed to an instruction decoder 36, and then to an instruction execution unit or pipeline 38. The instruction execution will typically access data in a register file 40. Additional data may be retrieved from the level one cache. If data or instructions are not available in the level one instruction or data caches 30 and 32, reference can then be made to the level two cache 34. Upon a miss in level two cache 34, level three cache 20 could be accessed, or main memory 26.

In one embodiment, the level one caches can have a line size of 32 bytes, while the level two cache would have a line size of 128 bytes, or have each line contain four lines of an level one cache. The line size of the level one cache is limited by the ability to route the buses internally. The level two cache will often have a larger line size so that it can interface with a larger, dedicated interface, level three cache 20 or to system bus 18.

When a particular microprocessor needs data, modifies data or does other operations on data, other microprocessors need to be apprised or searched as appropriate, since the data is shared. For example, microprocessor 14 may want the most recent copy of a particular piece of data at a particular address. It will issue a snoop request to snoop controller 28, which will then snoop on the internal caches of the other microprocessors to determine if it is present in any of those, and has been recently modified or updated.

A number of snooping protocols are provided, which typically store bits with each line in the cache to indicate its status. For example the MOESI protocol stores bits indicating whether the cache line has been modified, is exclusive, is shared, or has been invalidated. A number of other snooping protocols are also possible. As can be seen, a snoop to level two cache 34 for a particular line requires only a single line to be accessed. However, to prorogate that snoop to the level one caches requires four snoops internally, since the line size of the level two cache covers four lines of the level one cache. The present invention provides a mechanism for cutting down this number of internal snoops.

Figure 2:
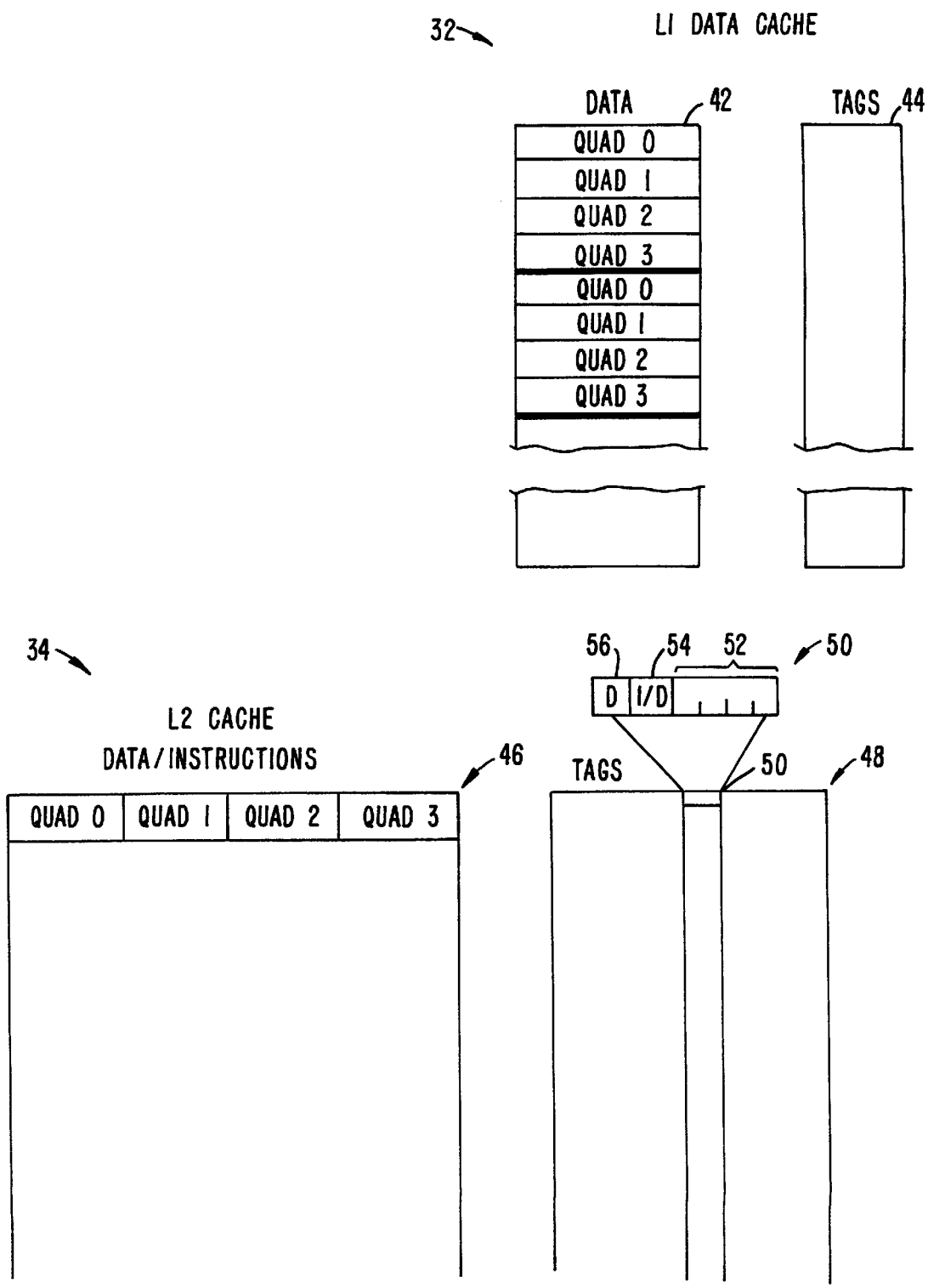
FIG. 2 illustrates the level one and level two cache structures of the present invention, including the inclusion vector.

FIG. 2 illustrates the data structure for the level one and level two cache according to the present invention. For illustration, the level one (L1) data cache is shown, having a number of lines. Each group of lines is divided into a number of quadrants 0–3 in a data array 42. The address is stored in the corresponding tag array 44, and is preferably a virtual address to allow quick access without translation. Level two (L2) cache 34 includes a data array 46. Each cache line contains data which would be in four lines in the level one cache. A corresponding tag array 48 includes the physical tag corresponding to the line. In addition, an inclusion vector 50 according to the present invention is provided.

The inclusion vector includes four bits 52. Each of bits 52 corresponds to a particular quadrant in the level one cache. Setting the bit to a one indicates that data for that quadrant is present in the level one cache. Thus, for example, if bits 52 are 0100, only quadrant one needs to accessed, since the remaining quadrants 0, 2 and 3 in the level one cache do not include data from that line in the level two cache. Although four bits are shown, and four quadrants, any other number could be used, such as two bits for two quadrants, six bits for six quadrants, eight bits for eight quadrants, etc.

In addition, inclusion vector 50 preferably includes an instruction/data bit 54. This bit can indicate whether the information in that line is in the instruction cache or the data cache, or can simply indicate whether or not it is present in the instruction cache. The other four bits 52 will serve the purpose of indicating which portions of the data are in the level one data or instruction cache.

Finally, a dirty bit 56 is included in the inclusion vector. This bit will indicate whether any of the data in the level one cache has been more recently modified than data in the level two cache. This is useful for reducing latency in the GET portion of a snoop, as will be discussed in more detail below.

Figure 3:
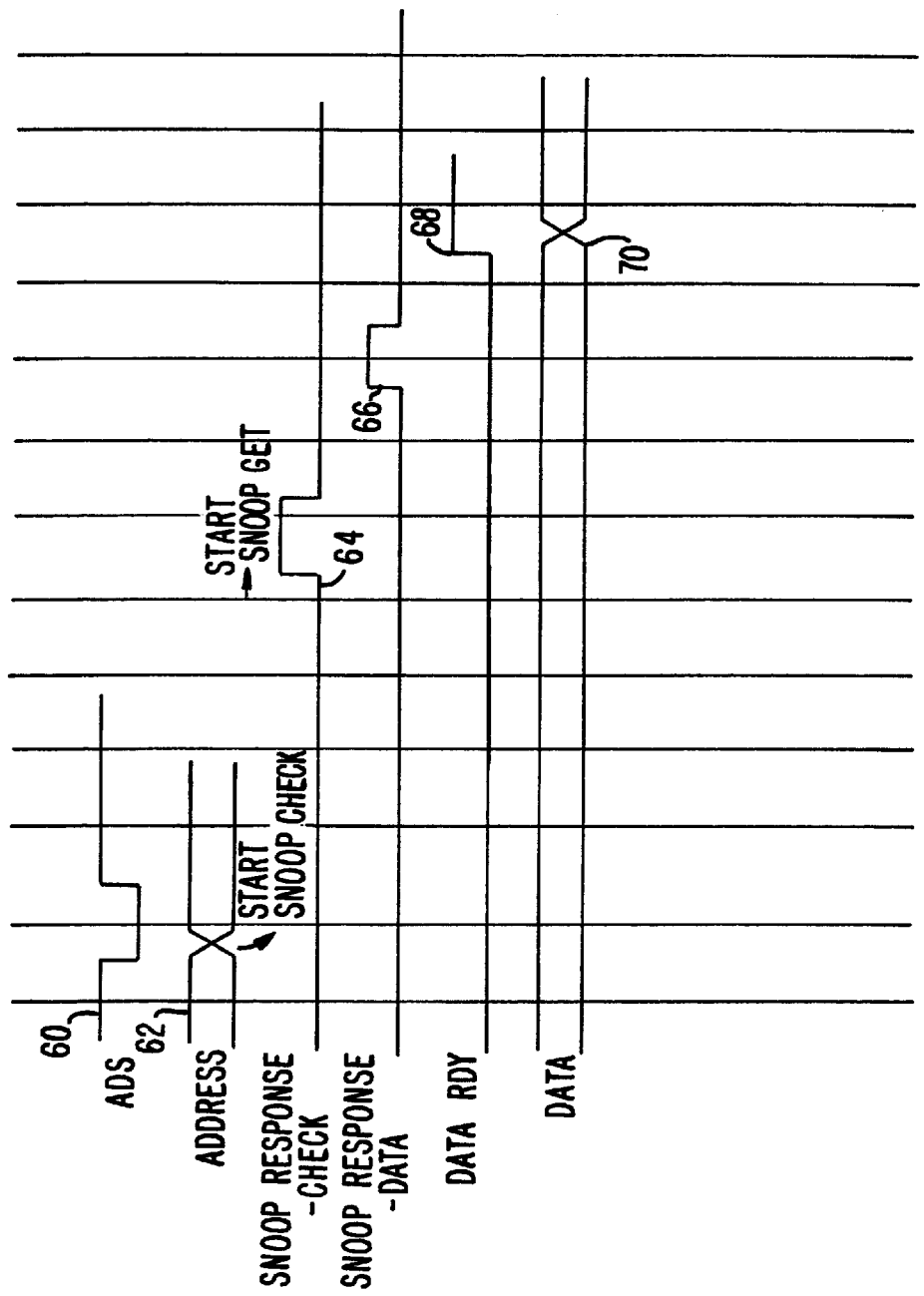
FIG. 3 is a timing diagram illustrating the latency of snoop operations.

FIG. 3 illustrates the timing of snoop in a system such as shown in FIG. 1. First, a active data snoop (ADS) signal 60 is activated, with the corresponding snoop address 62. This will start a snoop check within each microprocessor, with a snoop response-check signal 64 being provided several cycles later to indicate whether the data is present or not. Subsequently, a snoop response-data signal 66 indicates that the data will be provided, if it is present, or if it has been modified, dependent upon the type of snoop request. Subsequently, a data ready signal 68 is provided, along with the actual data 70. Most systems have a fixed or deterministic latency for the snoop response signal, and this invention allows that latency to be met.

Figure 4A:
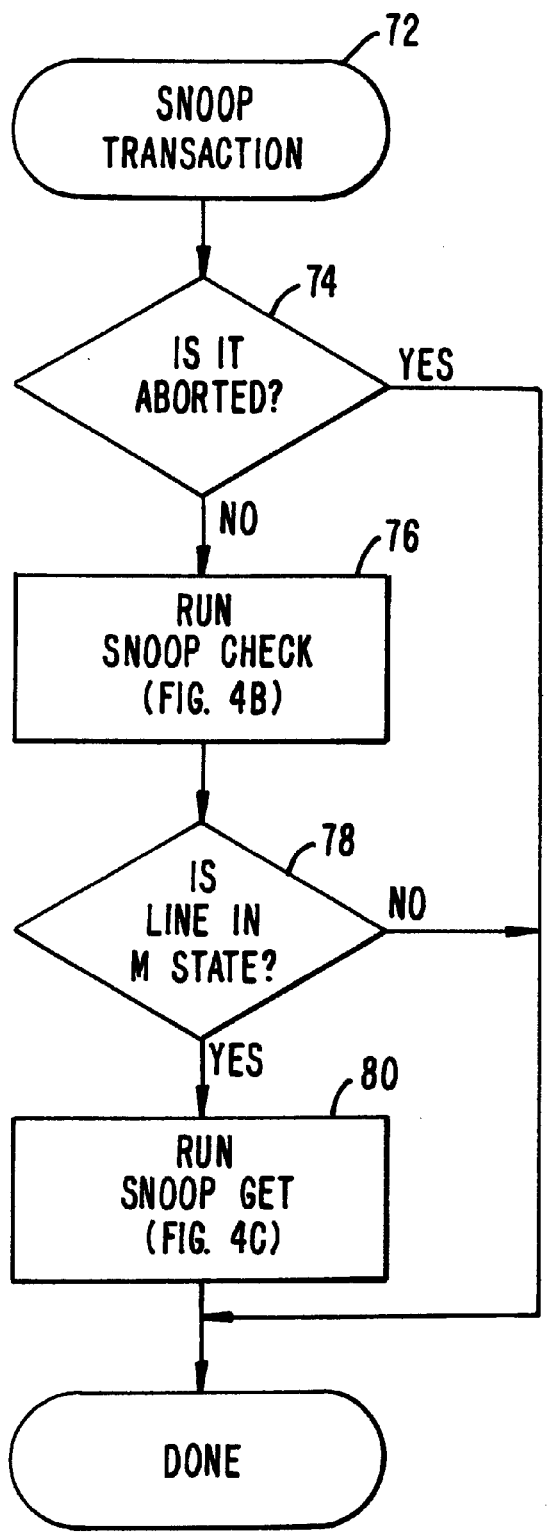
FIGS. 4A–4C are flowcharts illustrating the use of an inclusion vector in a snoop operation according to the invention.
Figure 4B:
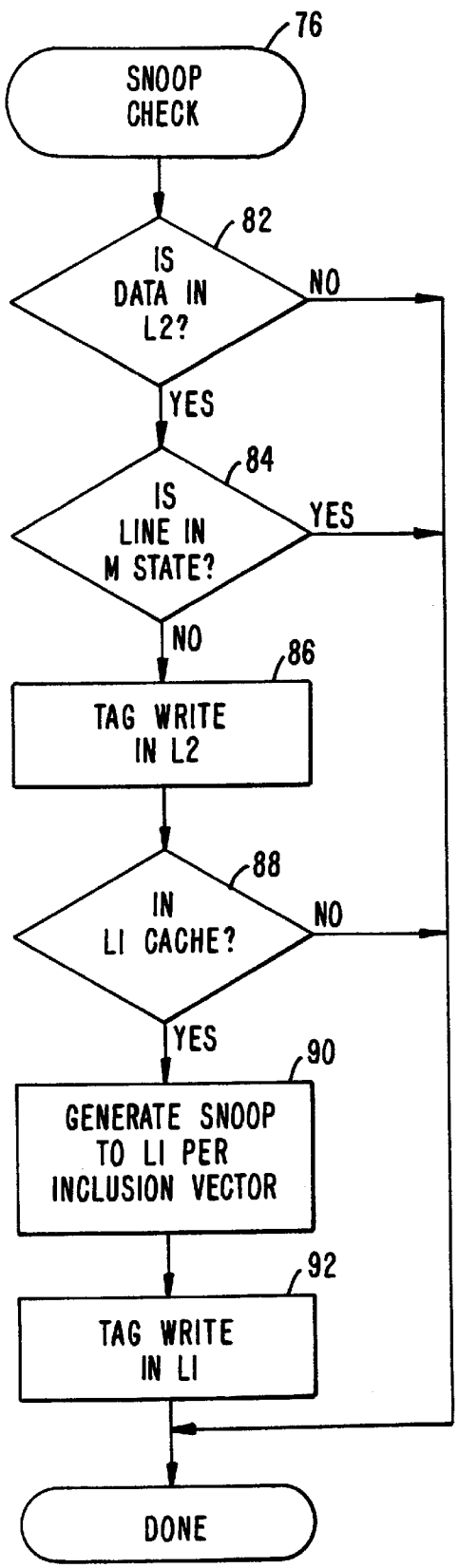
Figure 4C:
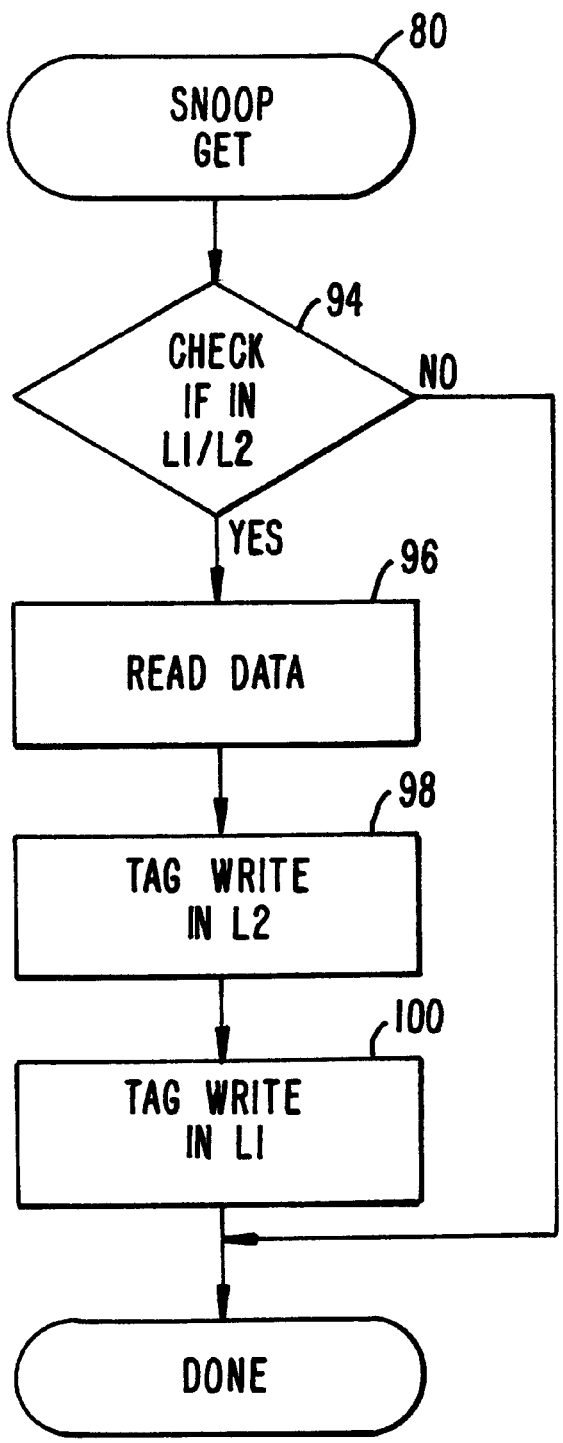

FIGS. 4A–4C are flow charts illustrating a snoop transaction. Referring to FIG. 4A, a snoop transaction is first initiated (step 72) and a test is done to see if it has been aborted by the microprocessor (step 74). If it has not been aborted, a snoop check routine (step 76) is run by each microprocessor, with the details shown in FIG. 4B. Then, the MOESI bits are examined to determine if the snooped line is in the M (modified) state (step 78). If it is modified, a snoop GET routine is run (step 80), is shown in more detail in FIG. 4C.

FIG. 4B illustrates a snoop check routine 76. First, the level two cache is examined to determine if the data is present (step 82). If it is not, the snoop check is completed and an appropriate signal can be returned. If it is present, the line is then tested to see if it is in the modified state (step 84). If it is, the snoop check routine is completed, and the snoop GET will then be done as shown in FIG. 4C. If it is not, a tag write is then done to the level two cache in accordance with the MOESI protocol. The inclusion vector is then examined to determine whether the data is in the level one cache (step 88). If it is, a snoop to the appropriate level one cache location is generated (step 90). A tag write in accordance with the MOESI or other snoop protocol is then done at the level one cache (step 92).

FIG. 4C shows the snoop GET routine 80. The level one and level two caches are checked for the presence of the required data (step 94). If the data is present, a read from the appropriate cache is done (step 96). Subsequently, a tag write in accordance with the MOESI or other snoop protocol is done in the level two cache (step 98) and, if appropriate, the level one cache (step 100). As can be seen, the use of the inclusion vector dramatically reduces the number of snoops to the level one cache which are required. The number is reduced to only that number that is absolutely necessary to accomplish the snoop.

Figure 5:
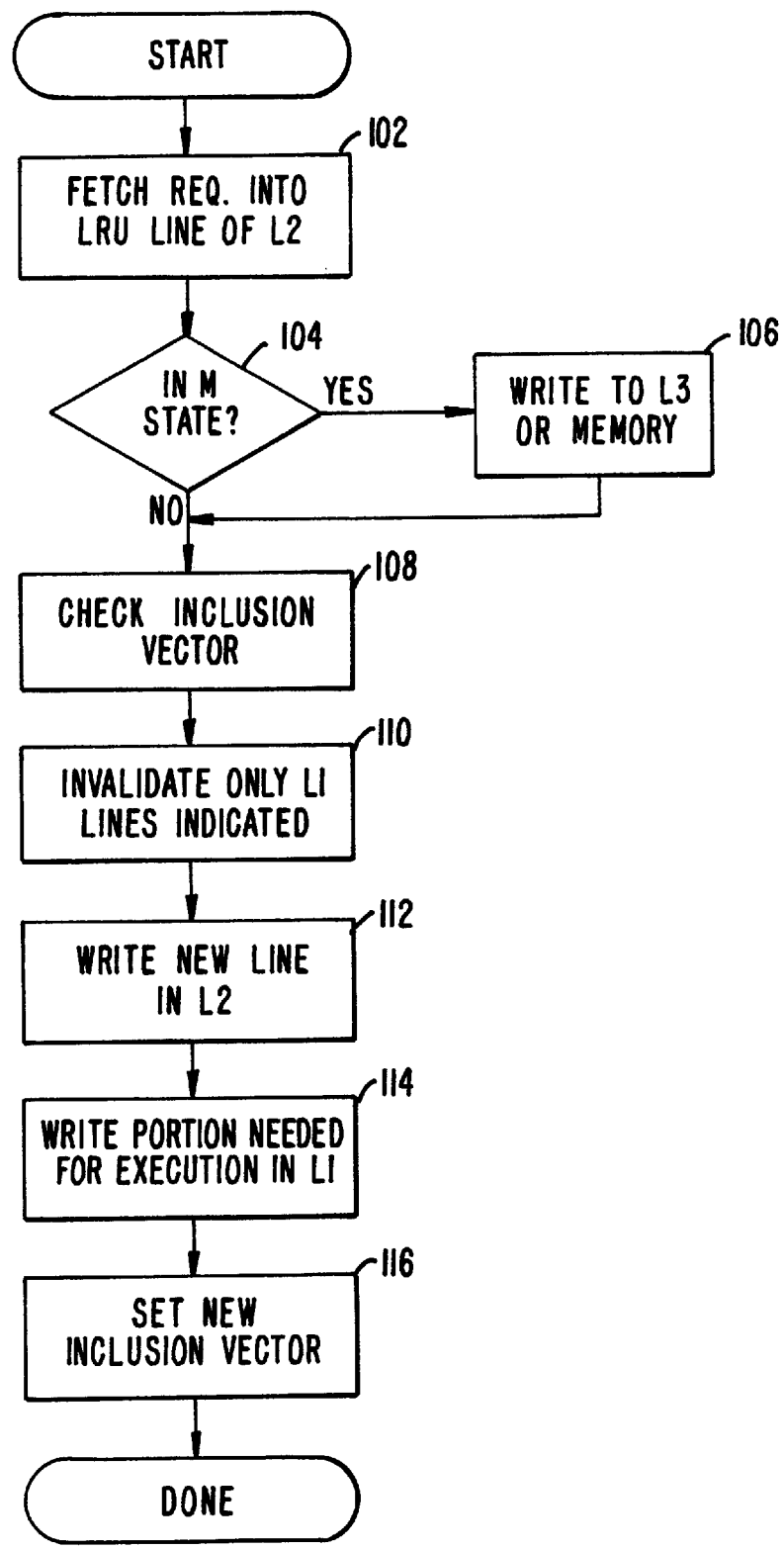
FIG. 5 is a flowchart illustrating the use of the inclusion vector upon a victimization.

The inclusion vector according to the present invention also reduces accesses to the level one cache for other types of operations. For example, as shown in FIG. 5, the victimization of a line in the level two cache can utilize the inclusion vector. A victimization occurs when a cache line needs to be written over in the level two cache for new data pulled from main memory. An algorithm such as the least recently used (LRU) algorithm may be used to determine which line to "victimize", or write over. When that line is victimized, it needs to be determined whether any of the data in that line is also in the level one caches. Typically, this would require four accesses to each of the four corresponding lines in the level one cache where the data might be located, to determine if it is present, and to invalidate the data in the level one cache. The present invention limits the number of accesses required.

As shown in the flow chart of FIG. 5, a fetch request for the new data into a line of the level two cache is first performed (step 102). The data in the line to be written over is examined to determine if it is in the modified state (step 104), and if it is, the data to be written over is first saved by writing it to the level three cache or to main memory (step 106). The inclusion vector is then checked (step 108) to determine if any of the data is also in the level one cache. To the extent that it is present, only the level one cache lines indicated by the inclusion vector are invalidated (step 110). After this has been accomplished, new data can be written over the line in the L2 cache (step 112). And, if appropriate in accordance with a write-through or other protocol, the portion of the new line required by the microprocessor can be written into the level one cache (step 114). Finally, the new inclusion vector can be written (step 116) either indicating which portions have been written in the level one cache, or indicating all zeros if it is not written into the level one cache.

Figure 6:
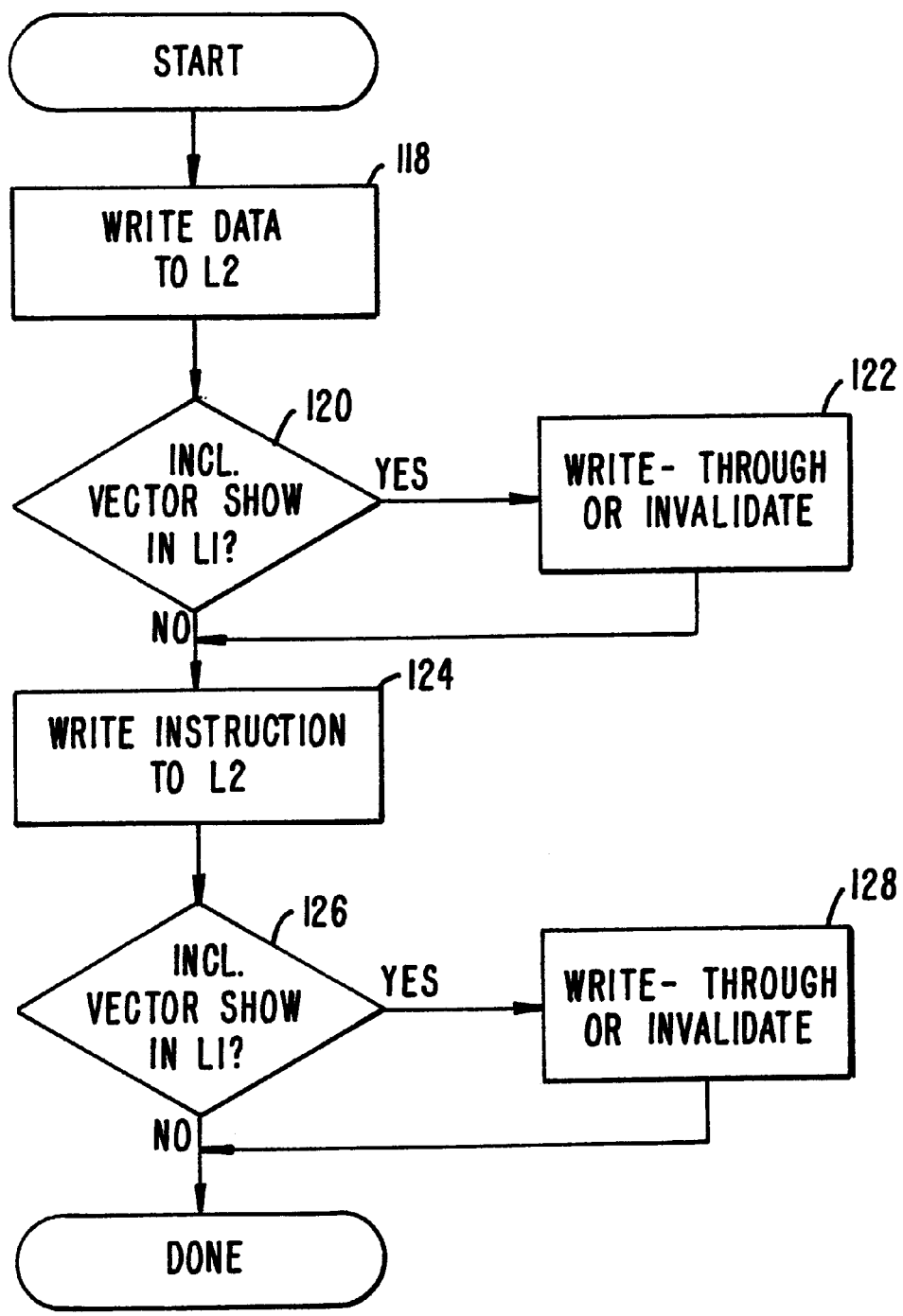
FIG. 6 is a flowchart illustrating the use of an inclusion vector with self-modifying code.

As shown by the flow chart of FIG. 6, the present invention can also be used when self-modifying code modifies a location in the on-chip cache. Self-modifying code will typically write new data, and then subsequently modify an instruction which either uses the new data or modifies the instruction in accordance with the new data. Thus, as shown in FIG. 6, first the new data is written to the level two cache (step 118). The inclusion vector is then examined to determine if any of that data that is modified is also in the level one cache (step 120). If it is, the data is written through to the level one cache location, or the level one cache lines are invalidated (step 122). Next, an instruction can be written to the level two cache (step 124). The inclusion vector can then be examined, with the single instruction/data bit being looked at, to determine if that instruction is in the level one instruction cache (step 126). If it is, again, the instruction can be written through to the level one cache, or invalidated there (step 128).

The inclusion vector of the present invention also has use for synonym detection. A synonym is where there are two or more virtual addresses corresponding to the same physical address. In an architecture where the level one cache is a virtual cache to allow quick access without requiring translation, and the level two cache is a physical cache, there is a need to detect synonyms.

Figure 7:
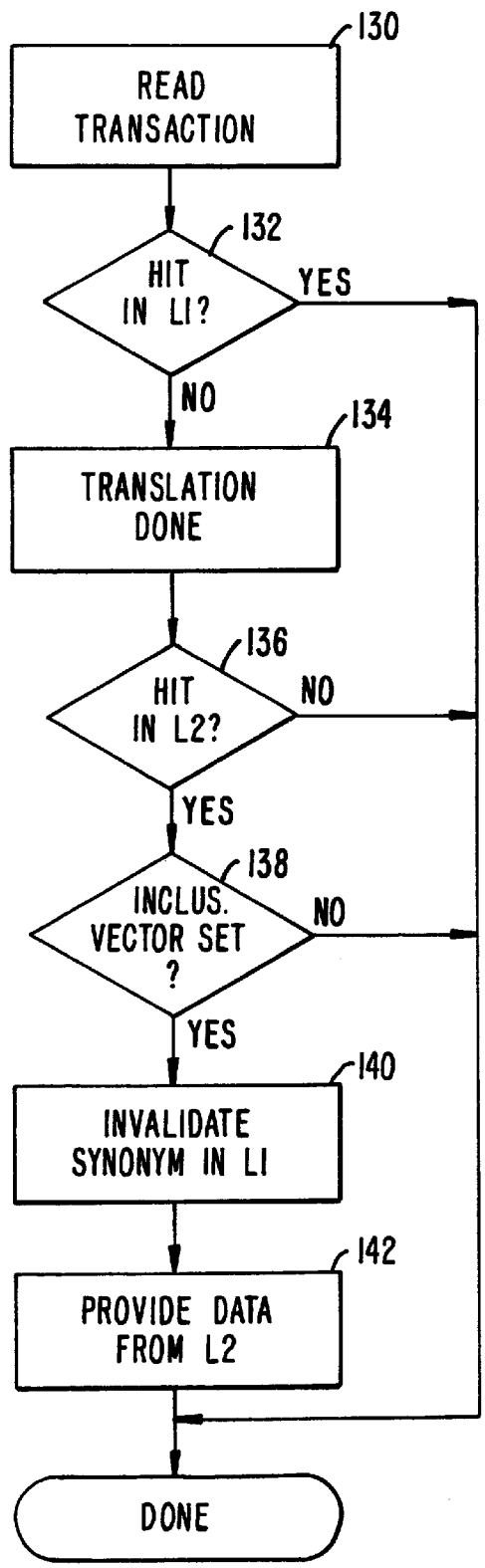
FIG. 7 is a flowchart illustrating the use of the inclusion vector for synonym detection.

As illustrated in FIG. 7, this occurs upon a read transaction (step 130) being performed to fetch data. If there is a hit in the level one cache (step 132) there is no need for the synonym detection. However, if there is no hit, a translation of the virtual addresses then done to a physical address (step 134). If there is no hit in the level two cache (step 136), again no synonym detection needs to be done, since without the physical address data being there, none of the synonyms could be present in the level one cache in a system using inclusion.

However, if there is a hit in the level two cache, there is a need to determine whether there is a synonym present in the level one cache. This is done by examining the inclusion vector to see if it is set (step 138). If it is not set, there is no synonym present. If it is set, there is a synonym present, and that synonym can be invalidated in the level one cache (step 140), and need only be invalidated for the particular quadrants present as indicated by the inclusion vector, thus providing a double savings in time. The data can then be provided, or could be provided concurrently, from the level two cache to the execution unit of the microprocessor (step 142).

As will be understood by those skilled in the art, the present invention my be embodied in other specific forms without departing from the spirit or essential characteristics thereof. Accordingly, the foregoing description is intended to illustrative, but not limiting, of the scope of the invention which is set forth in the following claims.

What is claimed is:

1. A cache architecture comprising:
    a first level cache having a first line length;
    a second level cache having a second line length longer than said first line length; and
    an inclusion vector for each line of said second level cache, said inclusion vector comprising a plurality of bits indicating which portions of said line of said second level cache are stored in said first level cache.

2. The cache architecture of claim 1 wherein said inclusion vector includes a separate bit for each line of said first level cache corresponding to a portion of a line of said second level cache.

3. The cache architecture of claim 1 further comprising:
    a first level instruction cache;
    a first level data cache; and
    an instruction cache inclusion bit stored in said second level cache for each of a plurality of lines of said second level cache, said instruction cache inclusion bit being a separate bit from said inclusion vector bits and indicating whether any portion of an associated second level cache line is stored in said instruction cache at all.

4. The cache architecture of claim 1 wherein said inclusion vector is stored in a tag array of said second level cache.

5. The cache architecture of claim 1 wherein said first level cache is a virtual tag cache, and said second level cache is a physical tag cache.

6. The cache architecture of claim 1 wherein said inclusion vector further comprises a dirty bit for each of at least a plurality of lines, said dirty bit indicating whether a portion of said line has been modified in said first level cache.

7. A cache architecture comprising:
    a first level instruction cache;
    a first level data cache having a first line length;
    a second level cache having a second line length longer than said first line length; and
    an inclusion vector for each line of said second level cache, said inclusion vector comprising a plurality of bits indicating which portions of said line of said second level cache are stored in said first level cache, said inclusion vector including a separate bit for each line of said first level cache corresponding to a portion of a line of said second level cache; and
    an instruction cache inclusion bit stored in said second level cache for each of a plurality of lines of said second level cache, said instruction cache inclusion bit being a separate bit from said inclusion vector bits and indicating whether any portion of an associated second level cache line is stored in said instruction cache at all.

8. The cache architecture of claim 7 wherein said inclusion vector is stored in a tag array of said second level cache.

9. The cache architecture of claim 7 wherein said first level cache is a virtual tag cache, and said second level cache is a physical tag cache.

10. The cache architecture of claim 7 wherein said inclusion vector further comprises a dirty bit for each of at least a plurality of lines, said dirty bit indicating whether a portion of said line has been modified in said first level cache.

11. A computer system comprising:
    a system bus;
    a main memory coupled to said bus; and
    a plurality of processors coupled to said bus, at least one of said processors having a cache architecture including a first level cache having a first line length, a second level cache having a second line length longer than said first line length, and an inclusion vector for each line of said second level cache, said inclusion vector comprising a plurality of bits indicating which portions of said line of said second level cache are stored in said first level cache.

12. A method for constructing a cache architecture comprising the steps of:

providing a first level cache having a first line length;

providing a second level cache having a second line length longer than said first line length; and providing an inclusion vector for each line of said second level cache, said inclusion vector comprising a plurality of bits indicating which portions of said line of said second level cache are stored in said first level cache.

13. A method for operating a cache architecture having a first level cache having a first line length and a second level cache having a second line length longer than said first line length, comprising the steps of:

providing an inclusion vector for each line of said second level cache, said inclusion vector comprising a plurality of bits indicating which portions of said line of said second level cache are stored in said first level cache; and examining said inclusion vector before accessing said first level cache to determine which portions of said first level cache need to be accessed.

14. The method of claim 13 wherein said accessing is for writing through data to said first level cache.

15. The method of claim 13 wherein said accessing is for invalidating any relevant line in said first level cache as a result of a victimization in said second level cache.

16. The method of claim 13 wherein said first level cache is a virtual cache, said second level cache is a physical cache, and further comprising the steps of:

examining said inclusion vector upon a miss in said level one cache and a hit in said level two cache;

invalidating any indicated entries in said level one cache, said indicated entries necessarily being synonym entries.

* * * * *